UNITED STATES PATENT OFFICE.

HERMAN FORSCHER, OF NEW YORK, N. Y.

FOOD PRODUCT AND PROCESS OF MAKING SAME.

1,130,723. Specification of Letters Patent. Patented Mar. 9, 1915.

No Drawing. Application filed January 14, 1914. Serial No. 811,954.

*To all whom it may concern:*

Be it known that I, HERMAN FORSCHER, a subject of the King of Hungary, residing at New York city, borough of Manhattan, county of New York, State of New York, have invented certain new and useful Improvements in Food Products and Processes of Making Same, of which the following is a full, clear, and exact description.

My invention relates to a food product and has for its object to provide a palatable nutritious compound or product, which is comparatively inexpensive and which will keep in condition for a considerable time, a further object being to provide an improved process of making the same.

I will now proceed to describe in detail my improved product and process of producing the aforesaid food product, the essential features of which will be summarized in the appended claims.

In manufacturing my food product in accordance with my process, I take lean raw meat (preferably beef) from which the fat and the larger veins have been removed, and scrape or chop the meat very fine, until the same becomes substantially pulpy. With one pound (for instance) of this chopped meat, I mix one pound of granulated sugar the fineness of these two ingredients permitting an intimate mixture of their particles. I then add a little water to the mixture and cook the same until it becomes viscid. The mixture is then allowed to cool and is kneaded until it hardens, whereupon it is ground or pulverized into a fine powder. Thereupon I mix this powder with two raw eggs, and add one pound of granulated sugar, together with a little water and cook the same until it again becomes a viscid mass. The mixture is then allowed to cool and is again kneaded until it becomes hardened; whereupon the mixture is again pulverized or ground into powder form. In this form it is then again boiled with a small quantity of water and stirred until it thickens or hardens into condition to be cut into cakes for packaging.

In the manufacture of my product the albumen or white of the eggs acts as a binder, and the yolks of the eggs, besides their nutritive quality, act as a coloring agent. The repeated cooking and pulverizing above described tend to fully break up the fibrous constituents of the meat, so that the same becomes thoroughly comminuted and commingled with the sugar.

Having now described my invention, what I claim and desire to secure by Letters Patent is:

1. A process of producing a food product consisting of the following steps: first cooking a mixture of sugar and comminuted meat in about equal quantities by weight until it becomes viscid; second cooling and pulverizing the same; boiling the same with raw eggs and about the same amount of sugar as before until it becomes viscid again; pulverizing it again and finally boiling it with water until it becomes thickened.

2. A process of producing a food product comprising the following steps, cooking a mixture of eggs and pulverized meat and sugar until it becomes viscid, pulverizing it and finally boiling it till it becomes thickened.

3. A cooked food product composed approximately of two parts of granulated sugar and one part of pulverized meat mixed with eggs and reduced to thickened form.

Signed at New York city, N. Y., this 13 day of January, 1914.

HERMAN FORSCHER.

Witnesses:
MAURICE BLOCK,
EDWARD A. JAMES.

Copies of this patent may be obtained for five cents each, by addressing the "Commissioner of Patents, Washington, D. C."